US012016100B1

(12) United States Patent
Jagmag et al.

(10) Patent No.: US 12,016,100 B1
(45) Date of Patent: Jun. 18, 2024

(54) CONTENT SYSTEM WITH LIGHTING DEVICE CALIBRATION FEATURE

(71) Applicant: Roku, Inc., San Jose, CA (US)

(72) Inventors: Adil Jagmag, Hollis, NH (US); Johan Gerard Willem Maria Janssen, Morgan Hill, CA (US); Sharada Palasamudram Ashok Kumar, Sunnyvale, CA (US); Sunil Ramesh, Cupertino, CA (US); Michael Cutter, Golden, CO (US); Shashank C. Merchant, Sunnyvale, CA (US); Yu-Cheng Lin, Golden, CO (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/340,814

(22) Filed: Jun. 23, 2023

(51) Int. Cl.
*H05B 47/175* (2020.01)

(52) U.S. Cl.
CPC .................................. *H05B 47/175* (2020.01)

(58) Field of Classification Search
None
See application file for complete search history.

(56) References Cited

U.S. PATENT DOCUMENTS

2007/0229667 A1* 10/2007 Xu .......................... H04N 9/73 348/E17.005
2018/0255625 A1* 9/2018 Lashina .................. G06F 3/041
2019/0124745 A1* 4/2019 Mason .................. G06F 18/231
2019/0166674 A1* 5/2019 Mason ............... H04N 21/8133
2019/0271455 A1* 9/2019 Foster ................... B64C 39/024
2019/0357338 A1* 11/2019 Magielse ............. H05B 47/175
2020/0022238 A1* 1/2020 Aliakseyeu .......... H05B 47/155
2020/0178365 A1* 6/2020 Lin ........................ H05B 45/20
2022/0327982 A1* 10/2022 Pytlarz .................... G01J 3/465
2023/0262863 A1* 8/2023 Aliakseyeu ............ H05B 45/20 315/294

* cited by examiner

*Primary Examiner* — Raymond R Chai
(74) *Attorney, Agent, or Firm* — McDonnell Boehnen Hulbert & Berghoff LLP

(57) ABSTRACT

In one aspect, an example method includes (i) causing a content-presentation device to output for presentation reference visual content; (ii) causing a lighting device to emit light in accordance with a lighting parameter, wherein initially the light emitted in accordance with the lighting parameter does not correspond to the reference visual content; (iii) receiving first input indicating an adjustment to the lighting parameter; (iv) responsive to receiving the first input, causing the lighting device to adjust the lighting parameter, thereby causing the lighting device to adjust the emitted light; (v) receiving second input indicating that the adjusted emitted light corresponds to the reference visual content; and (vi) responsive to receiving the second input, calibrating the lighting device at least by (i) causing storage of the adjusted lighting parameter and (ii) causing the lighting device to be configured to emit light in accordance with the stored lighting parameter.

20 Claims, 7 Drawing Sheets

CONTENT SYSTEM WITH LIGHTING DEVICE CALIBRATION FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) causing a content-presentation device to output for presentation reference visual content; (ii) causing a lighting device to emit light in accordance with a lighting parameter, wherein initially the light emitted in accordance with the lighting parameter does not correspond to the reference visual content; (iii) receiving first input indicating an adjustment to the lighting parameter; (iv) responsive to receiving the first input, causing the lighting device to adjust the lighting parameter, thereby causing the lighting device to adjust the emitted light; (v) receiving second input indicating that the adjusted emitted light corresponds to the reference visual content; and (vi) responsive to receiving the second input, calibrating the lighting device at least by (i) causing storage of the adjusted lighting parameter and (ii) causing the lighting device to be configured to emit light in accordance with the stored lighting parameter.

In another aspect, an example computing system is disclosed. The computing system comprises a processor and is configured for performing a set of acts that includes (i) causing a content-presentation device to output for presentation reference visual content; (ii) causing a lighting device to emit light in accordance with a lighting parameter, wherein initially the light emitted in accordance with the lighting parameter does not correspond to the reference visual content; (iii) receiving first input indicating an adjustment to the lighting parameter; (iv) responsive to receiving the first input, causing the lighting device to adjust the lighting parameter, thereby causing the lighting device to adjust the emitted light; (v) receiving second input indicating that the adjusted emitted light corresponds to the reference visual content; and (vi) responsive to receiving the second input, calibrating the lighting device at least by (i) causing storage of the adjusted lighting parameter and (ii) causing the lighting device to be configured to emit light in accordance with the stored lighting parameter.

In another aspect, an example non-transitory computer-readable medium is disclosed. The computer-readable medium has stored thereon program instructions that upon execution by a processor of a computing system, cause performance of a set of acts that includes (i) causing a content-presentation device to output for presentation reference visual content; (ii) causing a lighting device to emit light in accordance with a lighting parameter, wherein initially the light emitted in accordance with the lighting parameter does not correspond to the reference visual content; (iii) receiving first input indicating an adjustment to the lighting parameter; (iv) responsive to receiving the first input, causing the lighting device to adjust the lighting parameter, thereby causing the lighting device to adjust the emitted light; (v) receiving second input indicating that the adjusted emitted light corresponds to the reference visual content; and (vi) responsive to receiving the second input, calibrating the lighting device at least by (i) causing storage of the adjusted lighting parameter and (ii) causing the lighting device to be configured to emit light in accordance with the stored lighting parameter.

DETAILED DESCRIPTION

I. Overview

Figure 1:
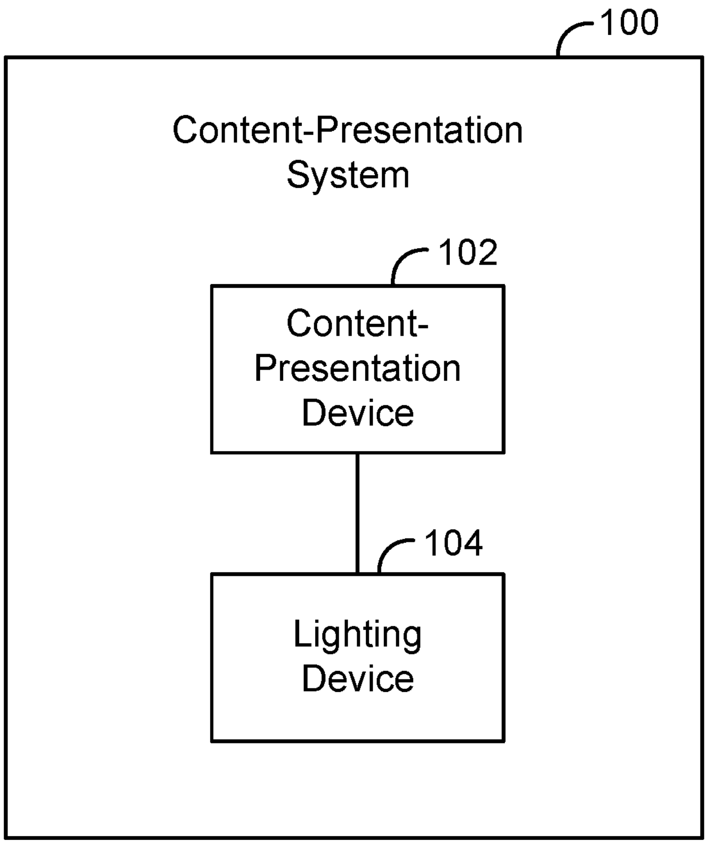
FIG. 1 is a simplified block diagram of an example content system in which various described principles can be implemented.

A content system can perform operations related to various types of content. For example, the content system can include a television that presents media content via a display screen and a sound speaker. In some cases, the content system can also include a light strip that is positioned around a perimeter of the display screen and that emits light in a manner that corresponds to the media content being presented. For example, the content system can detect colors along the edges of the display screen and can then cause the lighting device to emit the same colors in adjacent positions, to create a synchronized ambient lighting effect.

However, in some cases, the lighting effect may not be properly synchronized, which can create an undesirable effect. For example, in the case where the edge of the display screen displays content in red, the media system may instruct the lighting device to display red at a corresponding position. However, for various reasons (e.g., due to various hardware characteristics of the television and/or the light strip), the red of each may not be exactly the same, which could be distracting to a viewer. Similar issues could also be present with other types of lighting parameters, such as ones relating to brightness levels and positional alignment, among other possibilities.

The disclosed techniques help address these and other issues. In one aspect, disclosed is a technique for calibrating a lighting device. This technique involves (i) causing a content-presentation device (e.g., a television) to output for presentation reference visual content; (ii) causing a lighting device to emit light in accordance with a lighting parameter, wherein initially the light emitted in accordance with the lighting parameter does not correspond to the reference visual content; (iii) receiving first input indicating an adjustment to the lighting parameter; (iv) responsive to receiving the first input, causing the lighting device to adjust the lighting parameter, thereby causing the lighting device to adjust the emitted light; (v) receiving second input indicating that the adjusted emitted light corresponds to the reference visual content; and (vi) responsive to receiving the second input, calibrating the lighting device at least by (i) causing storage of the adjusted lighting parameter and (ii) causing the lighting device to be configured to emit light in accordance with the stored lighting parameter.

In this way, the user can use the reference content as a reference point for the purposes of adjusting the lighting parameter, and, after determining that the adjustment of the lighting parameter causes the adjusted emitted light to correspond to the reference content, the user could then provide instructions to the lighting device to calibrate it such that it stores the adjusted color, brightness level, position, etc. of light emitted by the lighting device, and configures itself to operate according to those adjustments (at appropriate times, such as when it is instructed to emit light with a given color, etc.) in the future after the content-presentation device and/or the lighting device complete the calibration process.

In addition, other example embodiments can leverage the use of a camera to help perform at least some of these as well as other operations.

II. Example Architecture

A. Content System

FIG. 1 is a simplified block diagram of an example content system 100. Generally, the content system 100 can perform operations related to various types of content, such as the presentation of media content and/or associated lighting. The media content can take the form of video content and/or audio content. As such, the media content can include a video content component and/or an audio content component. For context, there can be various types of media content. For example, media content can be or include a movie, a television program, or a commercial, or a portion or combination thereof, among numerous other possibilities.

Media content can be represented by media data, which can be generated, stored, and/or organized in various ways and according to various formats and/or protocols, using any related techniques now know or later discovered. For example, the media content can be generated by using a camera, a microphone, and/or other equipment to capture or record a live-action event. In other example, the media content can be synthetically generated by using any related media content generation techniques now know or later discovered.

As noted above, media data can also be stored and/or organized in various ways. For example, the media data can be stored and organized as a Multimedia Database Management System (MDMS) and/or in various digital file formats, such as the MPEG-4 format, among numerous other possibilities.

The media data can represent the media content by specifying various properties of the media content, such as video properties (e.g., luminance, brightness, and/or chrominance values), audio properties, and/or derivatives thereof. In some instances, the media data can be used to generate the represented media content. But in other instances, the media data can be a fingerprint or signature of the media content, which represents the media content and/or certain characteristics of the media content and which can be used for various purposes (e.g., to identify the media content or characteristics thereof), but which is not sufficient at least on its own to generate the represented media content.

In some instances, media content can include metadata associated with the video content and/or audio content. In the case where the media content includes video content and audio content, the audio content is generally intended to be presented in sync together with the video content. To help facilitate this, the media data can include metadata that associates portions of the video content with corresponding portions of the audio content. For example, the metadata can associate a given frame or frames of video content with a corresponding portion of audio content. In some cases, audio content can be organized into one or more different channels or tracks, each of which can be selectively turned on or off, or otherwise controlled. Media content can also include other types of metadata. For example, media content can include information related to associated lighting, such as lighting parameters or other information that can be used to control one or more lighting devices, for example.

In some instances, media content can be made up one or more segments. For example, in the case where the media content is a movie or a television program, the media content may be made up of multiple segments, each representing a scene of the movie or television program. In various examples, a segment can be a smaller or larger portion of the media content.

Returning back to the content system 100, this can include various components, such as a content-presentation device 102 and/or a lighting device 104. The content system 100 can also include one or more connection mechanisms that connect various components within the content system 100. For example, the content system 100 can include the connection mechanism represented by the line connecting the above-referenced components of the content system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

Generally, the content-presentation device 102 can be configured to obtain media content from a content source (e.g., from a local content source and/or from a remote content-distribution system) and to output the content for presentation. The content-presentation device 102 can take various forms. For example, the content-presentation device 102 can take the form of a television, a media player (e.g., a ROKU media player, among other possibilities) or a combination thereof (e.g., a television having an integrated media player), among other possibilities.

In one example, in the case where the content-presentation device 102 is a television (perhaps with an integrated media player), outputting the media content for presentation can involve the television outputting the media content via a user interface (e.g., outputting video content via a display screen and/or outputting audio content via a sound speaker), such that it can be presented to an end-user. As another example, in the case where the content-presentation device 102 is a media player, outputting the media content for presentation can involve the media player outputting the media content via a communication interface (e.g., an HDMI interface), such that it can be received by a television and in turn output by the television for presentation to an end-user. As such, in various scenarios, the content-presentation device 102 can obtain and output media content for presentation to an end-user.

Generally, the lighting device 104 can be configured to emit light into an environment, such as a viewing environment associated with the content-presentation device 102. In this way, a viewer of media content being presented by the content-presentation device 102 can view both the presented media content and light emitted by lighting device 104 at the same time.

Figure 2:
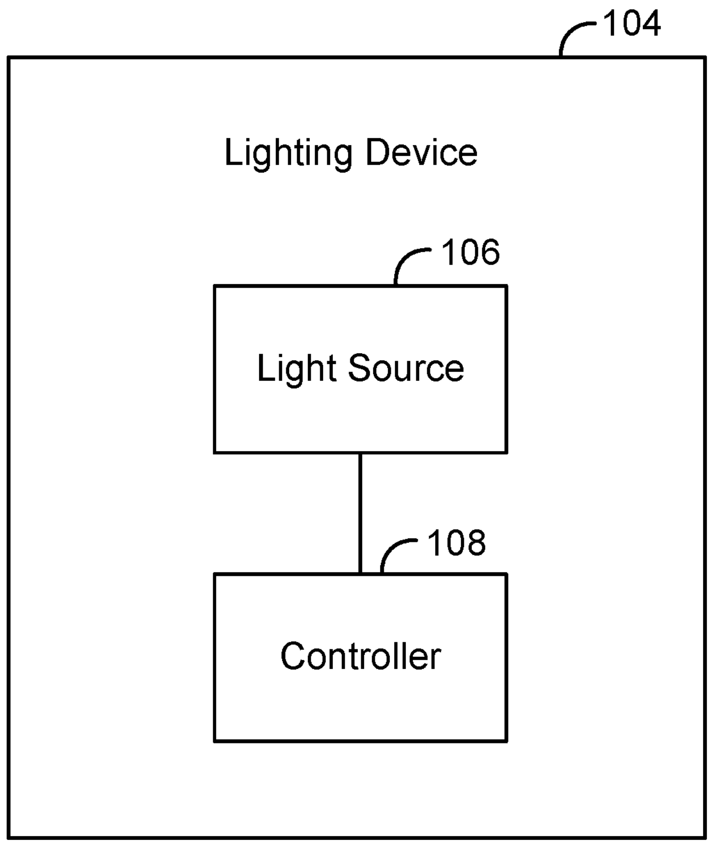
FIG. 2 is a simplified block diagram of an example lighting device in which various described principles can be implemented.

FIG. 2 is a simplified block diagram of an example lighting device 104. The lighting device 104 can include various components, such as a light source 106 and/or a controller 108. The lighting device 104 can also include one or more connection mechanisms that connect various components within the lighting device 104. For example, the lighting device 104 can include the connection mechanism represented by the line connecting the above-referenced components of the lighting device 104, as shown in FIG. 2.

The light source 106 can include one or more light sources that can emit light according to one or more lighting parameters. The controller 108 can control operation of the lighting device 104, such as by causing the light source 106 to emit light according to any of those one or more lighting parameters.

The one or more lighting parameters can relate to various characteristics of the emitted light, including for example an on/off state, a color, and/or a brightness level of the emitted light or a portion thereof, among other possibilities. In some situations, the lighting parameters could include a time-related component such that the controller 108 could cause the light source 106 to emit light with on/off states, colors, levels of brightness, etc. that change over time. The controller 108 can be implemented as a computing system and can include various components, such as a processor, a data storage unit, a communication interface, and/or controlling circuitry, for example, to carry out such functionality.

The lighting device 104 (and/or components thereof) can have a variety of different configurations. For example, the lighting device 104 can take the form of a light strip that has a light source in the form of an array of light-emitting diodes (LEDs). Light strips can come in different lengths and/or can have multiple segments that can be connected together and/or detached from each other, to create light strips of different lengths. In some instances, light strips can be configured such that the light source has multiple regions, each of which can be separately controlled with one or more respective lighting parameters. As such, in one example, a lighting strip could have ten regions, arranged one after another in sequence, where the first region can emit light having a first color, brightness level, etc., the second region can emit light having a second and different color, brightness level, etc., and so on. In some instances, the light strip can be controlled such that different regions emit light in different ways at different times, to create certain lighting effects, such as to simulate light moving from one region to the next, across the light strip, among numerous other possibilities.

The lighting device 104 (and/or components thereof) can come in lots of other configurations as well. For example, the lighting device 104 could take the form of a light bulb, light bar, and/or a string of lights, among numerous other possibilities. Some or all of these may share some of the characteristics described above in connection with light strips (e.g., having multiple controllable regions of light, for example) and/or have other characteristics specific to their particular configuration.

The lighting device 104 can also be positioned/arranged in various ways. For example, the lighting device 104 could be positioned/arranged near a display screen component of the content-presentation device 102 such that media content presented on the display screen and light emitted from the lighting device 104 can generally be presented together. In some cases, the content-presentation device 102 or another device can communicate with the lighting device 104 and cause it to emit light in a manner that corresponds to the media content being presented on the display screen. For example, the content-presentation device 102 can detect colors along the edges of display screen and can then cause the lighting device to emit the same or similar colors in adjacent positions, to create a synchronized ambient lighting effect. In other examples, media content metadata can include lighting parameters and/or related instructions that the content-presentation device 102 or another device can extract and use to cause the lighting device 104 to emit light in a given manner, such as one that corresponds to the media content being presented on the display screen.

In one example, in the case where the lighting device 104 is a light strip, the light strip could be positioned/arranged such that it is generally aligned with at least a portion of a perimeter of a display screen component of the content-presentation device 102. In particular, the light strip could be mounted along some or all of the edges of the display screen, on the back of the content-presentation device 102 and generally near some or all of the edges, or on a wall behind the content-presentation device 102 and generally near some or all of the edges, as a few possibilities.

In some instances, the content system 100 can include multiple instances of at least some of the described components. The content system 100 and/or components thereof can take the form of a computing system, an example of which is described below.

B. Computing System

Figure 3:
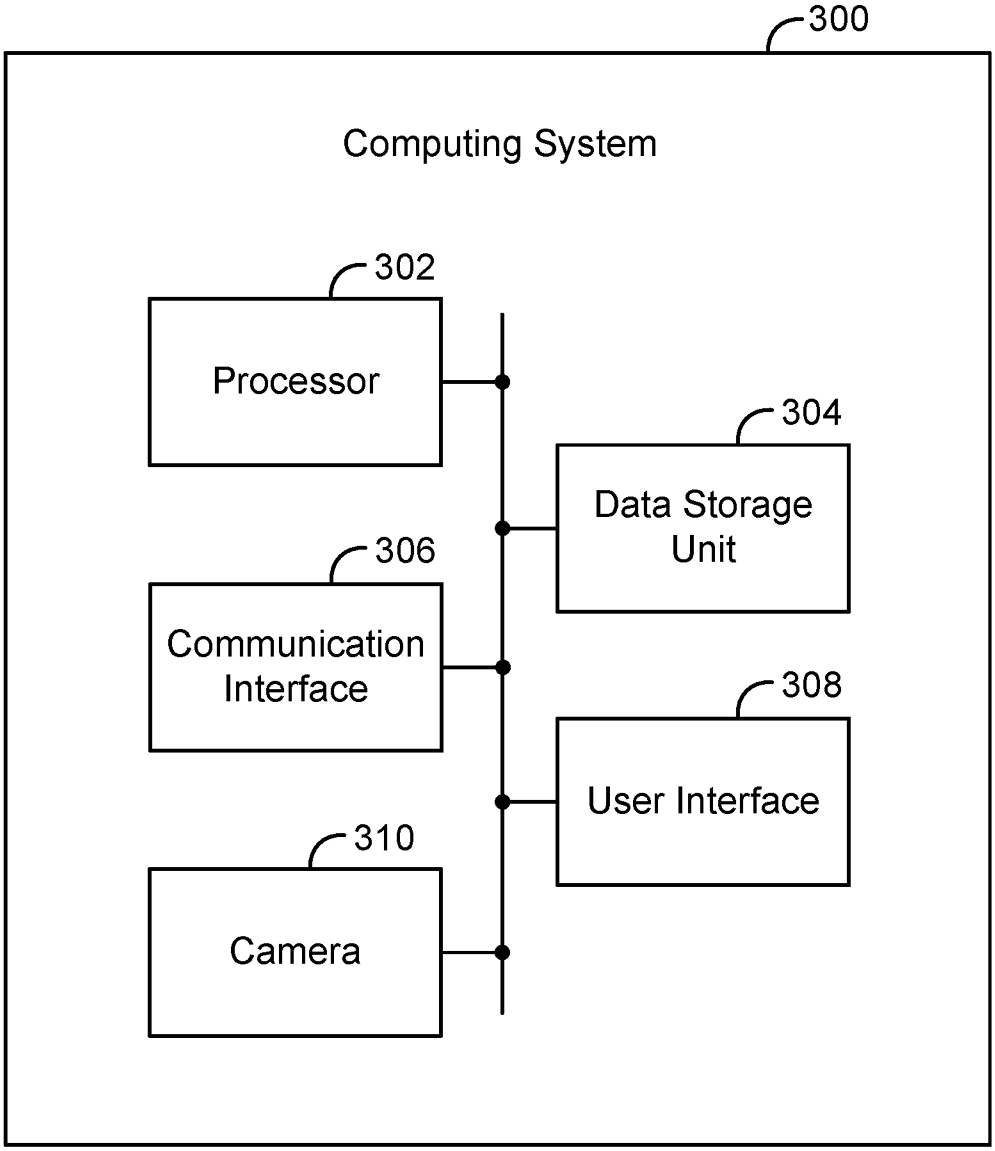
FIG. 3 is a simplified block diagram of an example computing system in which various described principles can be implemented.

FIG. 3 is a simplified block diagram of an example computing system 300. The computing system 300 can be configured to perform and/or can perform various operations, such as the operations described in this disclosure. The computing system 300 can include various components, such as a processor 302, a data storage unit 304, a communication interface 306, a user interface 308, and/or a camera 310.

The processor 302 can be or include a general-purpose processor (e.g., a microprocessor) and/or a special-purpose processor (e.g., a digital signal processor). The processor 302 can execute program instructions included in the data storage unit 304 as described below.

The data storage unit 304 can be or include one or more volatile, non-volatile, removable, and/or non-removable storage components, such as magnetic, optical, and/or flash storage, and/or can be integrated in whole or in part with the processor 302. Further, the data storage unit 304 can be or include a non-transitory computer-readable storage medium, having stored thereon program instructions (e.g., compiled or non-compiled program logic and/or machine code) that, upon execution by the processor 302, cause the computing system 300 and/or another computing system to perform one or more operations, such as the operations described in this disclosure. These program instructions can define, and/or be part of, a discrete software application.

In some instances, the computing system 300 can execute program instructions in response to receiving an input, such as an input received via the communication interface 306 and/or the user interface 308. The data storage unit 304 can also store other data, such as any of the data described in this disclosure.

The communication interface 306 can allow the computing system 300 to connect with and/or communicate with another entity according to one or more protocols. Therefore, the computing system 300 can transmit data to, and/or receive data from, one or more other entities according to one or more protocols. In one example, the communication interface 306 can be or include a wired interface, such as an Ethernet interface or a High-Definition Multimedia Interface (HDMI). In another example, the communication interface 306 can be or include a wireless interface, such as a cellular or WI-FI interface.

The user interface 308 can allow for interaction between the computing system 300 and a user of the computing system 300. As such, the user interface 308 can be or include an input component such as a keyboard, a mouse, a remote controller, a microphone, and/or a touch-sensitive panel. The user interface 308 can also be or include an output component such as a display screen (which, for example, can be combined with a touch-sensitive panel) and/or a sound speaker.

The camera 310 can be any type of camera and/or related components, configured to capture and image and/or video content data.

The computing system 300 can also include one or more connection mechanisms that connect various components within the computing system 300. For example, the computing system 300 can include the connection mechanisms represented by lines that connect components of the computing system 300, as shown in FIG. 3.

The computing system 300 can include one or more of the above-described components and can be configured or arranged in various ways. For example, the computing system 300 can be configured as a server and/or a client (or perhaps a cluster of servers and/or a cluster of clients) operating in one or more server-client type arrangements, such as a partially or fully cloud-based arrangement, for instance.

As noted above, the content system 100 and/or components of the content system 100 can take the form of a computing system, such as the computing system 200. In some cases, some or all of these entities can take the form of a more specific type of computing system, such as a desktop or workstation computer, a laptop, a tablet, a mobile phone, a television, a set-top box, a media player, and/or a head-mountable display device (e.g., virtual-reality headset or an augmented-reality headset), among numerous other possibilities.

III. Example Operations

The content system 100, the computing system 300, and/or components of either can be configured to perform and/or can perform various operations. As noted above, the content system 100 can perform operations related to calibrating the lighting device 104. These and related operations will now be described in the context of two sets of example embodiments.

A. First Set of Example Embodiments

In a first set of example embodiments, calibrating the lighting device 104 can involve the content system 100 (*i*) causing the content-presentation device 102 to output for presentation reference visual content; (ii) causing the lighting device 104 to emit light in accordance with a lighting parameter, wherein initially the light emitted in accordance with the lighting parameter does not correspond to the reference visual content; (iii) receiving first input indicating an adjustment to the lighting parameter; (iv) responsive to receiving the first input, causing the lighting device 104 to adjust the lighting parameter, thereby causing the lighting device 104 to adjust the emitted light; (v) receiving second input indicating that the adjusted emitted light corresponds to the reference visual content; and (vi) responsive to receiving the second input, calibrating the lighting device 104 at least by (a) storing the adjusted lighting parameter and (b) causing the lighting device 104 to be configured to emit light in accordance with the stored lighting parameter.

To begin, the content system 100 can cause the content-presentation device 102 to output for presentation reference visual content. The content system 100 can do this in various ways. For example, the content-presentation device 102 (or another device, such as a mobile device) can pair with the lighting device 104 and one or both devices can enter a calibration mode in which the content-presentation device 102 communicates with the lighting device 104 to calibrate the lighting device 104. As part of this, the content-presentation device 102 and/or the lighting device 104 can perform various operation such as those described herein. For example, the content-presentation device 102 can obtain (e.g., from a data storage unit on the content-presentation device 102 or on the lighting device 104) reference content and output that reference content for presentation. The reference content could be any type of video content, such as an image or video content. There can be various types of reference content. For example, reference content can indicate a reference color, a reference brightness level, and/or a reference position, among numerous other possibilities.

Next, the content system 100 can cause the lighting device 104 to emit light in accordance with a lighting parameter, wherein initially the light emitted in accordance with the lighting parameter does not correspond to the reference visual content. The content system 100 can do this in various ways. For example, as part of the content-presentation device 102 and/or the lighting device 104 entering the calibration mode, the content-presentation device 102 can obtain (e.g., from a data storage unit on the content-presentation device 102 or on the lighting device 104) a lighting parameter and can transmit an instruction to the lighting device 104 that causes the lighting device to emit light in accordance with that lighting parameter. As noted above, the lighting parameter could relate to a color, level of brightness, and/or a position of at least a portion of light emitted by the lighting device 104, among other possibilities.

The content system 100 can then receive first input indicating an adjustment to the lighting parameter and responsive to receiving the first input, cause the lighting device to adjust the lighting parameter, thereby causing the lighting device to adjust the emitted light. The content system 100 can receive such input in various ways. For example, this could involve the content-presentation device 102 receiving input from a user via a remote control device or a mobile device such as a phone, tablet, or laptop. In response to receiving that input, the content-presentation device 102 could then cause the lighting device to adjust the lighting parameter, such as by transmitting a corresponding instruction to the lighting device 104 to cause it to do so. In this way, a user could use the reference content as a reference point and could then input instructions to adjust the color, brightness level, position, etc. of light emitted by the lighting device 104.

The content system 100 can then receive second input indicating that the adjusted emitted light corresponds to the reference visual content and responsive to receiving the second input, can calibrate the lighting device 104 at least by (i) causing storage of the adjusted lighting parameter (e.g., in the lighting device 104 and/or in the content-presentation device 102) and (ii) causing the lighting device 104 to be configured to emit light in accordance with the stored lighting parameter (e.g., by transmitting a suitable instruction to the lighting device 104, which the lighting device 104 can receive and use to configure itself). In this way, the user could use the reference content as a reference point and, after determining that the adjustment of the lighting parameter causes the adjusted emitted light to correspond to the reference content, the user could then provide instructions to the lighting device 104 to calibrate it such that is stores the adjusted color, brightness level, position, etc. of light emitted by the lighting device 104, and configures itself to operate according to those adjustments (at appropriate times, such as when it is instructed to emit light with a given color, etc.) in the future after the content-presentation device 102 and/or the lighting device 104 complete the calibration process. As part of this process, the lighting device 104 and/or another device could also store other relevant data, such as mapping data that maps a given instruction to a given lighting parameter and/or lighting operation, which can be used to configure the lighting device 104 to operate as discussed above.

Figure 4:
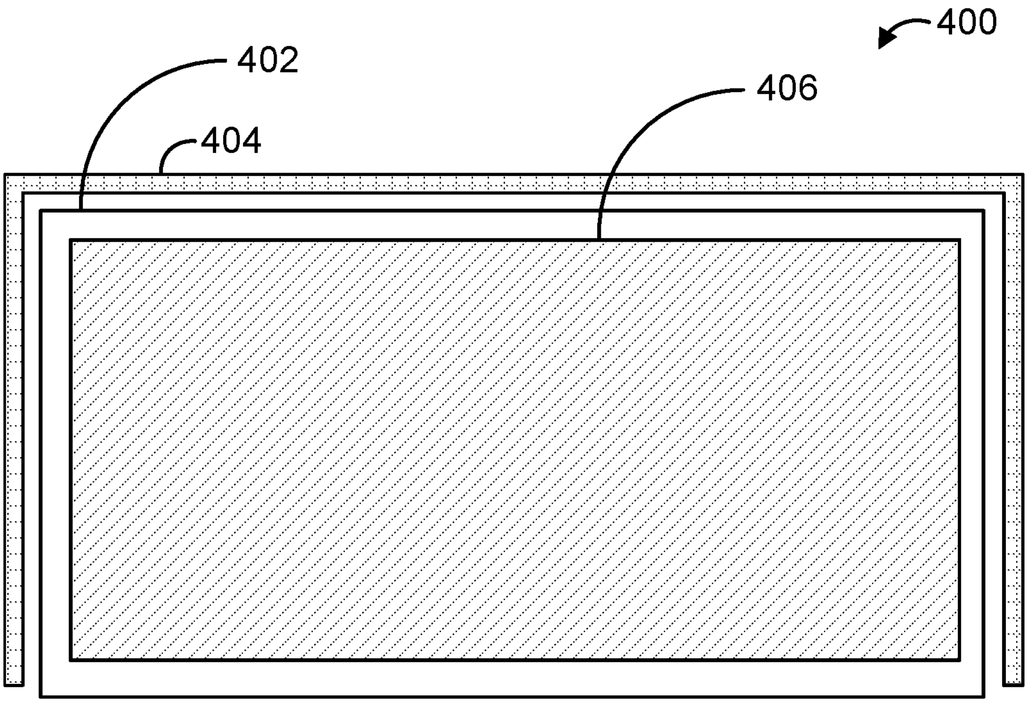
FIG. 4 is a simplified diagram illustrating a first state of an example scenario depicting a display screen and a light strip in which various described principles can be implemented.

To provide additional context around the concepts discussed above, some example scenarios will now be described. FIG. 4 is a simplified diagram illustrating a first example scenario 400 depicting (i) a display screen 402 component of a content-presentation device and (ii) a light source 404 component of a light strip. The display screen 402 is presenting reference content 406, which is a rectangle filled with a reference color depicted in the figure by a diagonal line pattern. And the light source 404 is emitting light in a given color depicted in the figure by a grid pattern. This could be a situation in which the display screen 402 is instructed to display red and the lighting device is instructed to emit light that is red. However, for various reasons (e.g., due to various hardware characteristics, etc. of the devices), the two reds may not actually be exactly the same color (i.e., they may be have slightly different RGB values, and as such, may be slightly different, thus potentially negatively impacting the synchronization effect). Given this, in line with the operations discussed above, a user could use a remote control device or the like to cause the lighting device 104 to adjust the color of the emitted light (e.g., by using up and down buttons to adjust one or more RGB values, for example), until the color of light emitted by the lighting device 104 corresponds to the color of the reference content (i.e., until the colors match).

Figure 5:
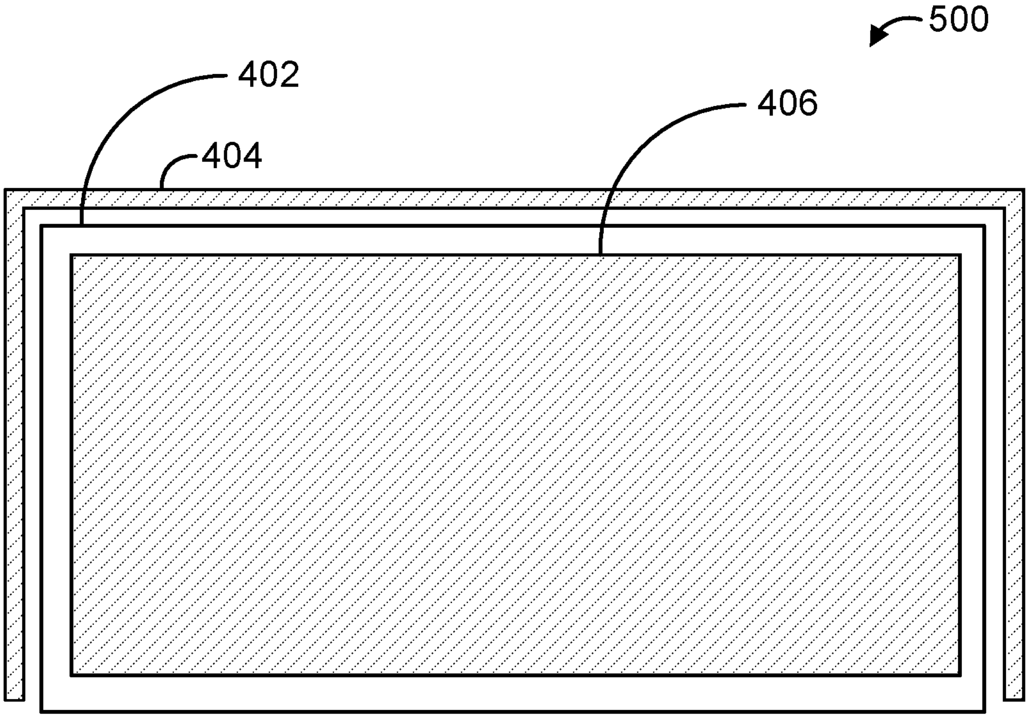
FIG. 5 is a simplified diagram illustrating a second state of the example scenario of FIG. 4.

FIG. 5 is a simplified diagram illustrating the identical scenario as in FIG. 4, except that the light source 404 is now emitting light in an adjusted color (depicted in the figure by a diagonal pattern) that now corresponds with the reference color 406. Upon the user determining that this is the case, the user can provide second input, such that the lighting device can be appropriately calibrated at least by storing the adjusted color, and by being configured such that the lighting device emits light with the stored color when the lighting device is instructed to emit light in the color at issue. In this way, the lighting device can be calibrated on how to output "red" when instructed to do so by the content-presentation device or another device, for example, such that the red light emitted by the lighting device matches the red presented on the display screen of the content-presentation device. Of course, the lighting device could be configured in the same or similar ways in connection with various other colors.

The same FIGS. 4 and 5 could also be used to illustrate a second example scenario, but where the lighting parameter relates to brightness level rather than color. As such, in the context of FIG. 4, the reference content 406 could be a rectangle filled with a white light (or any other color of light) having a reference level of brightness depicted in the figure by a diagonal line pattern. And the light source 404 could be emitting light of the same color, but with a different level of brightness depicted in the figure by a grid pattern. This could be a situation in which the display screen 402 is instructed to display a given color at a given brightness level and the lighting device is instructed to emit the same color at the same brightness level. However, for various reasons (e.g., due to various hardware characteristics, ranges of brightness, etc.), the two levels of brightness may not actually be the same (i.e., they may be have slightly different lumens, etc., and as such, may have slightly different brightness levels, which again could potentially negatively impact the synchronization effect). Given this, in line with the operations discussed above, a user could use a remote control device or the like to cause the lighting device to adjust the brightness level of the emitted light (e.g., by using up and down buttons to adjust one or more lumen values, for example), until the brightness level of the light emitted by the lighting device corresponds to the brightness level of the reference content. In some instances, the two brightness levels corresponding to each other could mean that the levels are similar, but in other cases, the user may determine that it is preferable for the one or the other to be brighter than the other, perhaps based on a particular ratio, etc. and as such, the appropriate degree of sufficient correspondence can be configured as desired.

Figure 6:
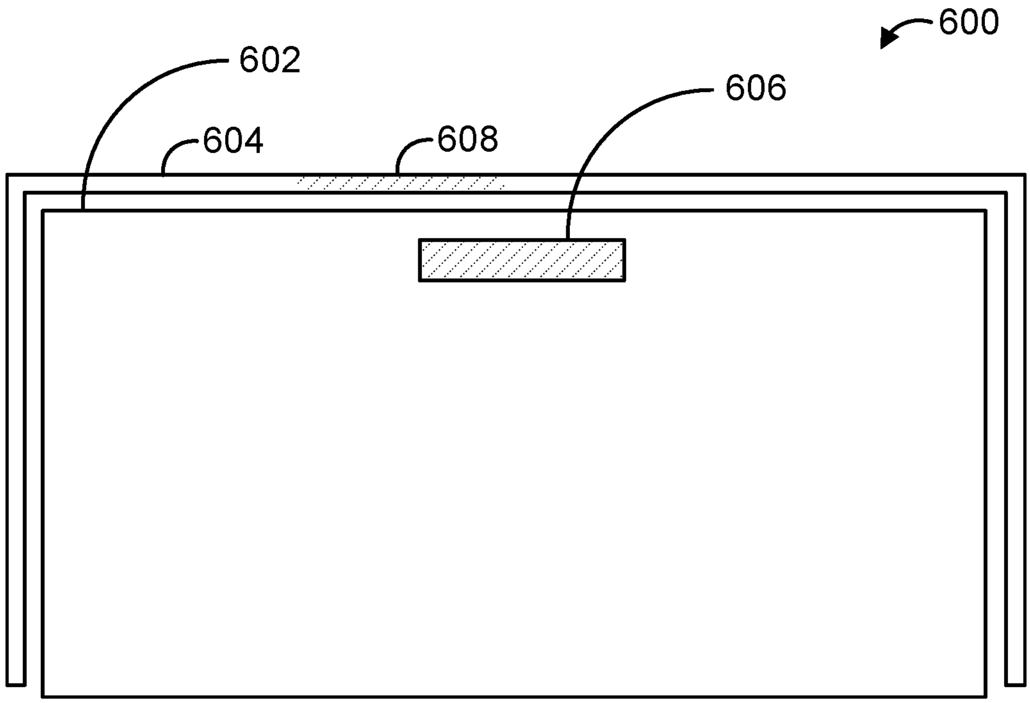
FIG. 6 is a simplified diagram illustrating a first state of another example scenario depicting a display screen and a light strip in which various described principles can be implemented.

FIG. 6 is a simplified diagram illustrating a third example scenario 600 depicting (i) a display screen 602 component of a content-presentation device and (ii) a light source 604 component of a light strip. The display screen 602 is presenting reference content 606, which is a rectangle in a reference position, depicted in the figure as a rectangle filled in with a diagonal line pattern. And the light source 604 is emitting light in a given positon 608 (which could be a center point of a given segment of the light strip, for example) depicted in the figure by a diagonal line pattern. This is a situation in which the light source is not properly aligned with the display screen 602. In particular, the horizontal portion of the light strip is shifted to the left with respect to the upper edge of the display screen. This can happen for various reasons, such as due to an offset in the mounted position of the light strip. Given this, in line with the operations discussed above, a user could use a remote control device or the like to cause the lighting device to adjust the emitted light position 608 (e.g., by using left and right directional buttons, for example to move the position of emitted light in a linearly shifting fashion), until the emitted light position aligns with the reference position (i.e., such that the emitted light positon corresponds to the reference content position).

Figure 7:
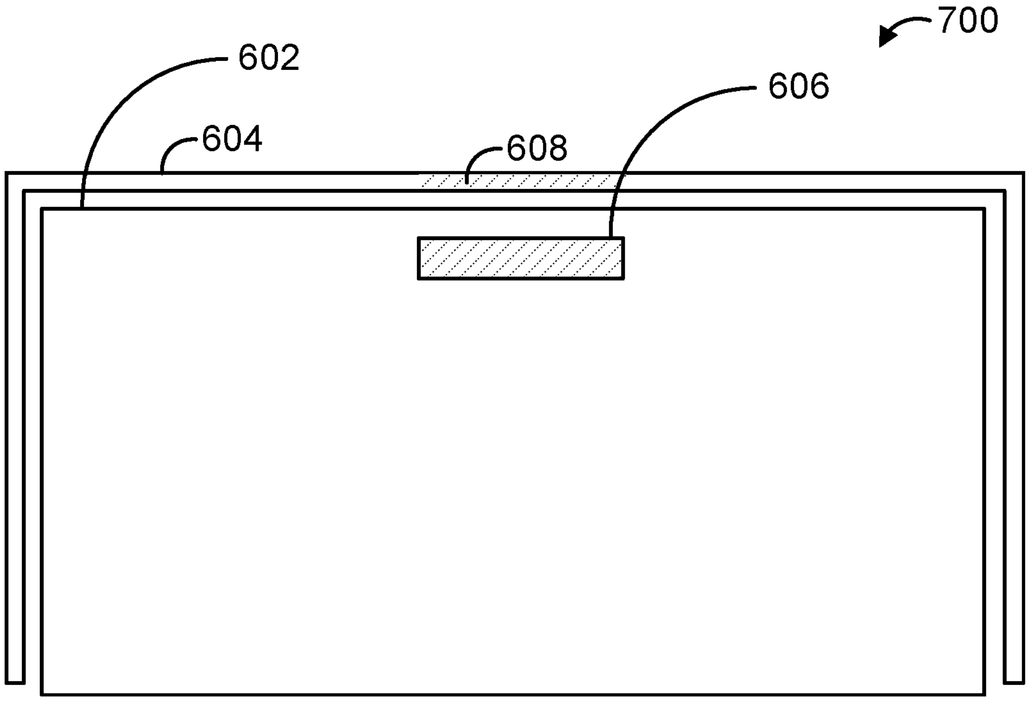
FIG. 7 is a simplified diagram illustrating a second state of the example scenario of FIG. 6.

FIG. 7 is a simplified diagram illustrating the identical scenario as in FIG. 6, except that the light source 604 is now emitting light with a position 608 that has been shifted to the left such that it aligns with the reference content 606. Upon the user determining that this is the case, the user can provide second input, such that the lighting device can be appropriately calibrated at least by storing the adjusted position, and by operating such that it emits light based on the adjusted position. In this way, the lighting device can be calibrated on how to emit light in a way that properly corresponds to content displayed on the display screen 602, for example.

In other alignment-related examples, the same or similar operations could be performed in connection with other portions of the light strip (e.g., the left vertical portion or the right vertical portion). In each case, the display screen 602 could output appropriate reference context (e.g., a rectangular oriented near the left/right edge of the screen, as appropriate), to facilitate aligning other portions of the light strip. But other ways of doing this are possible as well.

It should be noted that the above example scenarios have been provided for illustration purposes only and there could be many other example scenarios that could apply in connection with disclosed techniques. Indeed, reference content can be configured in various ways, according to various shapes, sizes, lengths, colors, levels of brightness, etc., and the light strip or other lighting source can emit light according to a wide variety of different lighting parameters, which can be adjusted such that the emitted light can correspond with the reference content, thereby facilitating calibrating the lighting device in the same ways as discussed above or in similar ways. In some instances, multiple ones of these scenarios can be combined together such that a user can calibrate many different types of lighting parameters at once, for example. Also, in the context of the adjusted emitted light corresponding to the reference visual content, what constitutes a sufficient correspondence can be configured as desired (e.g., based on a color, etc. of the adjusted emitted light and the reference color, etc. having some predefined threshold extent of similarity with each other, for instance).

B. Second Example Set of Embodiments

In other approaches, a second example set of embodiments can leverage use of a camera. Here, in one aspect, calibrating a lighting device 104 can involve the content system 100 (*i*) causing the content-presentation device 102 to output for presentation reference visual content; (ii) causing the lighting device 104 to emit light in accordance with a lighting parameter, wherein initially the light emitted in accordance with the lighting parameter does not correspond to the reference visual content; (iii) using a camera to continually capture an environment that includes the reference visual content and the emitted light, wherein the camera generates capture data representing the continually captured environment; (iv) while continually capturing the environment, analyzing the generated capture data to (a) compare the light emitted in accordance with the lighting parameter with the reference visual content, and (b) continually causing the lighting device 104 to adjust the lighting parameter, thereby causing the lighting device 104 to adjust the emitted light, until detecting, based on the comparing, that the adjusted emitted light corresponds to the reference visual content; and (v) responsive to detecting, based on the comparing, that the adjusted emitted light corresponds to the reference visual content, calibrating the lighting device 104 at least by (i) causing storage of the adjusted lighting parameter and by (ii) causing the lighting device 104 to be configured to emit light in accordance with the stored lighting parameter. The above-described and related operations will now be described in greater detail.

To begin, a computing system having a camera, such as the computing system 300, can perform at least some of the operations described in connection with the first set of example embodiments, but can leverage the camera to perform additional or alternative operations. The computing system 300 can take various forms. For example, the computing system can take the form of a remote control device or a mobile device, such as a phone, tablet, or laptop computing, that includes a camera configured to capture an environment associated with the content system 100.

In one example, the computing system 300 can cause the content-presentation device 102 to output for presentation reference visual content and can cause the lighting device 104 to emit light in accordance with a lighting parameter, where initially the light emitted in accordance with the lighting parameter does not correspond to the reference visual content, such as in the various ways described above in connection with the first set of example embodiments.

However, instead of or in addition to using received input to adjust the lighting parameter, the computing system 300 can use the camera 310 to continually capture an environment that includes the reference visual content and the emitted light, where the camera generates capture data representing the continually captured environment. For example, the camera could do this by generating capture data representing captured video of that environment. Then, while continually capturing the environment, the computing system 300 can analyze the generated capture data to (a) compare the light emitted in accordance with the lighting parameter with the reference visual content, and (b) continually cause the lighting device 104 to adjust the lighting parameter, thereby causing the lighting device 104 to adjust the emitted light, until detecting, based on the comparing, that the adjusted emitted light corresponds to the reference visual content.

For example, referring back to the first example scenario above in which the display screen 402 is presenting reference content 406, which is a rectangle filled with a reference color depicted in the figure by a diagonal line pattern, and the light source 404 is emitting light in a given color depicted in the figure by a grid pattern, but where the two reds may not actually be exactly the same color, the computing system 300 could use the capture data to compare the light emitted in accordance with the lighting parameter with the reference visual content, and determine that to be the case. The computing system 300 could then continually adjust the color of the emitted light until detecting that the two reds match (i.e., that the adjusted emitted light corresponds to the reference visual content). In some instances, as part of the computing system 300 comparing the light emitted in accordance with the lighting parameter with the reference visual content and determining that they do not correspond to each other, the computing system 300 can detect the color of each, and can use mapping table or other logic to determine what type of adjustments to make (e.g., to increase or decrease an R, G, or B value, as appropriate) to get the two colors to match, for example.

The computing system 300 can make similar adjustments with respect to other lighting parameters as well. Indeed, the computing system 300 could analyze brightness levels, light positions, etc., and make appropriate adjustments (e.g., by changing the brightness level or by shifting the position of the emitted light) until the adjusted emitted light corresponds to the reference visual content, such as in the various ways discussed above in connection with the first set of example embodiments. To perform such operations, the computing system 300 can apply any content, color, level of brightness, etc. detection/recognition techniques now known or later discovered. In some instances, this could involve applying an average or some other type of function to certain groups of pixels or pixel attributes, such as luminance, brightness, and/or chrominance values, among others.

Then, responsive to detecting, based on the comparing, that the adjusted emitted light corresponds to the reference visual content, the computing system 300 can calibrate the lighting device 104 at least by (i) causing storage of the adjusted lighting parameter and (ii) causing the lighting device 104 to be configured to emit light in accordance with the stored lighting parameter, such as in the various ways discussed above in connection with the first set of example embodiments.

C. Other Related Concepts

In some instances, the content system 100, computing system 300, or another entity can perform other operations to help facilitate calibration of the lighting device 104. For example, before performing the operations discussed above, the content-presentation device 102 can first perform some pre-calibration operations, to help make the environment at issue more conducive to performing calibration-related operations. For example, the content system 100 can use one or more sensors (e.g., an ambient light sensor integrated into one or more devices within the content system 100) to detect various lighting conditions of the environment. The content system 100 can also detect any other controllable devices in the environment (e.g., controllable lights, shares, blinds, or any IoT-type device), and based on the detected sensor data, the content system 100 can cause those devices to operate in such a way so as to optimize the lighting conditions of the environment for purposes of calibrating the lighting device. For example, in the case where the content system 100 detects an excessive amount of light in the environment where such light may interfere with the calibration process as noted above, the content system 100 could control one or more devices in such a way so as to limit the amount of ambient light in the room (e.g., by turning off lights, closing shares/blinds, etc.).

In other examples, the content system 100 could schedule one or more calibration-related operations, such as those described above, so that calibration is performed at certain times of the day when lighting in the environment is optimal for the calibration. In other examples, the content system 100 could perform the calibration operations at each of multiple different times throughout the day, such that the lighting device 104 could be calibrated to operate in different ways at different times of the day, based on the different types of ambient lighting in the environment.

D. Example Methods

Figure 8:
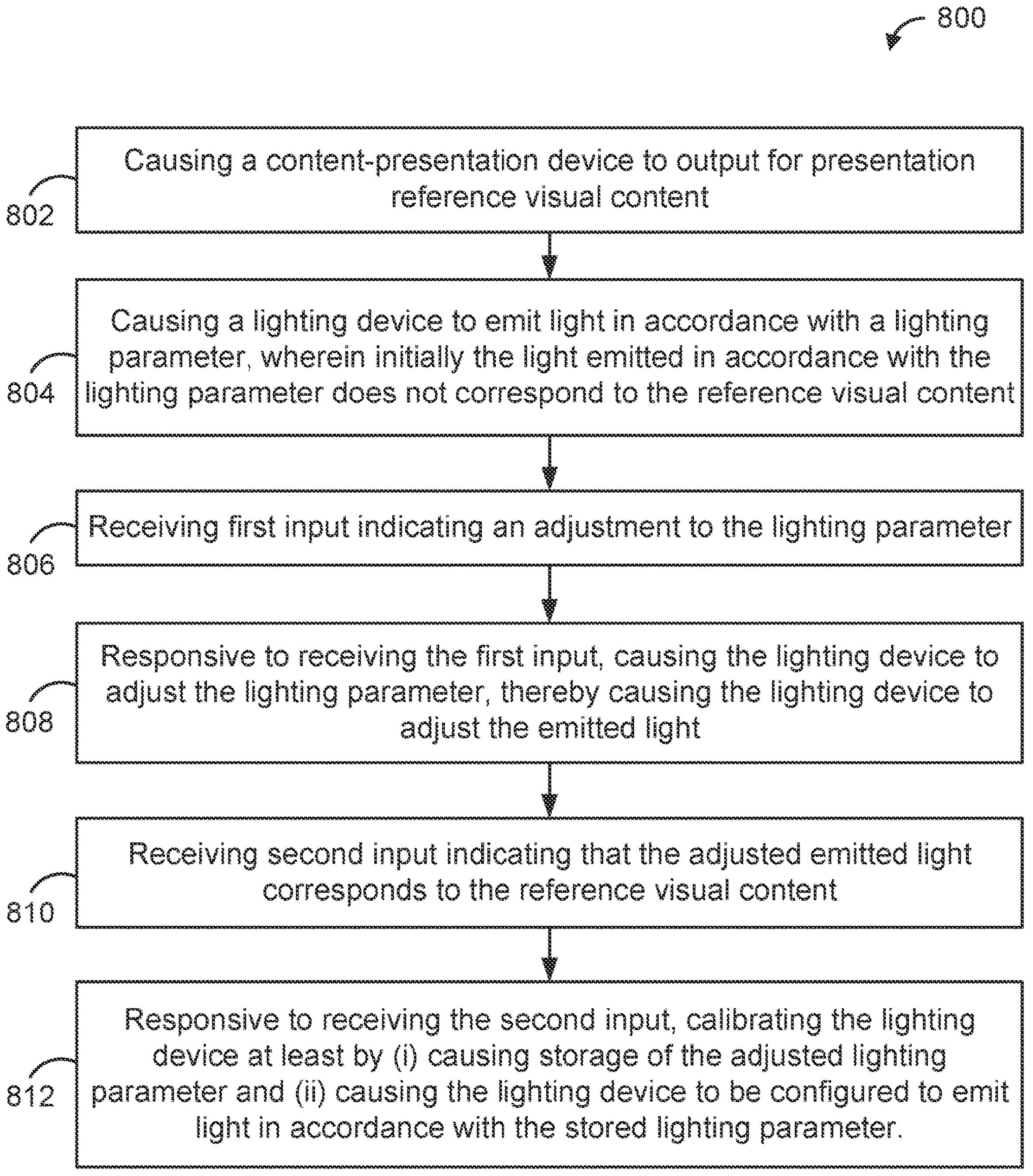
FIG. 8 is a flow chart of an example method.

FIG. 8 is a flow chart illustrating an example method 800. The method 800 can be carried out by a content system, such as the content system 100, the content-presentation device 102, or more generally, by a computing system, such as the computing system 300. At block 802, the method 800 includes (i) causing a content-presentation device to output for presentation reference visual content; (ii) causing a lighting device to emit light in accordance with a lighting parameter, wherein initially the light emitted in accordance with the lighting parameter does not correspond to the reference visual content; (iii) receiving first input indicating an adjustment to the lighting parameter; (iv) responsive to receiving the first input, causing the lighting device to adjust the lighting parameter, thereby causing the lighting device to adjust the emitted light; (v) receiving second input indicating that the adjusted emitted light corresponds to the reference visual content; and (vi) responsive to receiving the second input, calibrating the lighting device at least by (a) causing the lighting device to store the adjusted lighting parameter and (b) causing the lighting device to be configured to emit light in accordance with the stored lighting parameter.

In some examples, the content-presentation device is a television, the reference visual content is an image, and the lighting device is a lighting strip. The lighting strip can be arranged such that it generally aligns with a perimeter of a display screen of the content-presentation device. In various implementations, receiving the first input and receiving the second input comprises receiving each respective input from a remote control device operated by a user.

In some examples, the reference visual content includes a reference color, the lighting parameter specifies a color, and the second input indicating that the adjusted emitted light corresponds to the reference visual content involves the second input indicating that a color of the adjusted emitted light and the reference color have a threshold extent of similarity with each other.

In other examples, the reference visual content includes a reference brightness level, the lighting parameter specifies a brightness level, and the second input indicating that the adjusted emitted light corresponds to the reference visual content involves the second input indicating that a brightness level of the adjusted emitted light and the reference brightness level have a threshold extent of similarity with each other.

In other examples, the reference visual content includes a reference position, the lighting parameter specifies a position of emitted light, and the second input indicating that the adjusted emitted light corresponds to the reference visual content involves the second input indicating that the position of the emitted light and the reference positon have a threshold extent of similarity with each other. In some implementations, causing the lighting device to adjust the emitted light involves moving the position of emitted light in a linearly shifting fashion.

Figure 9:
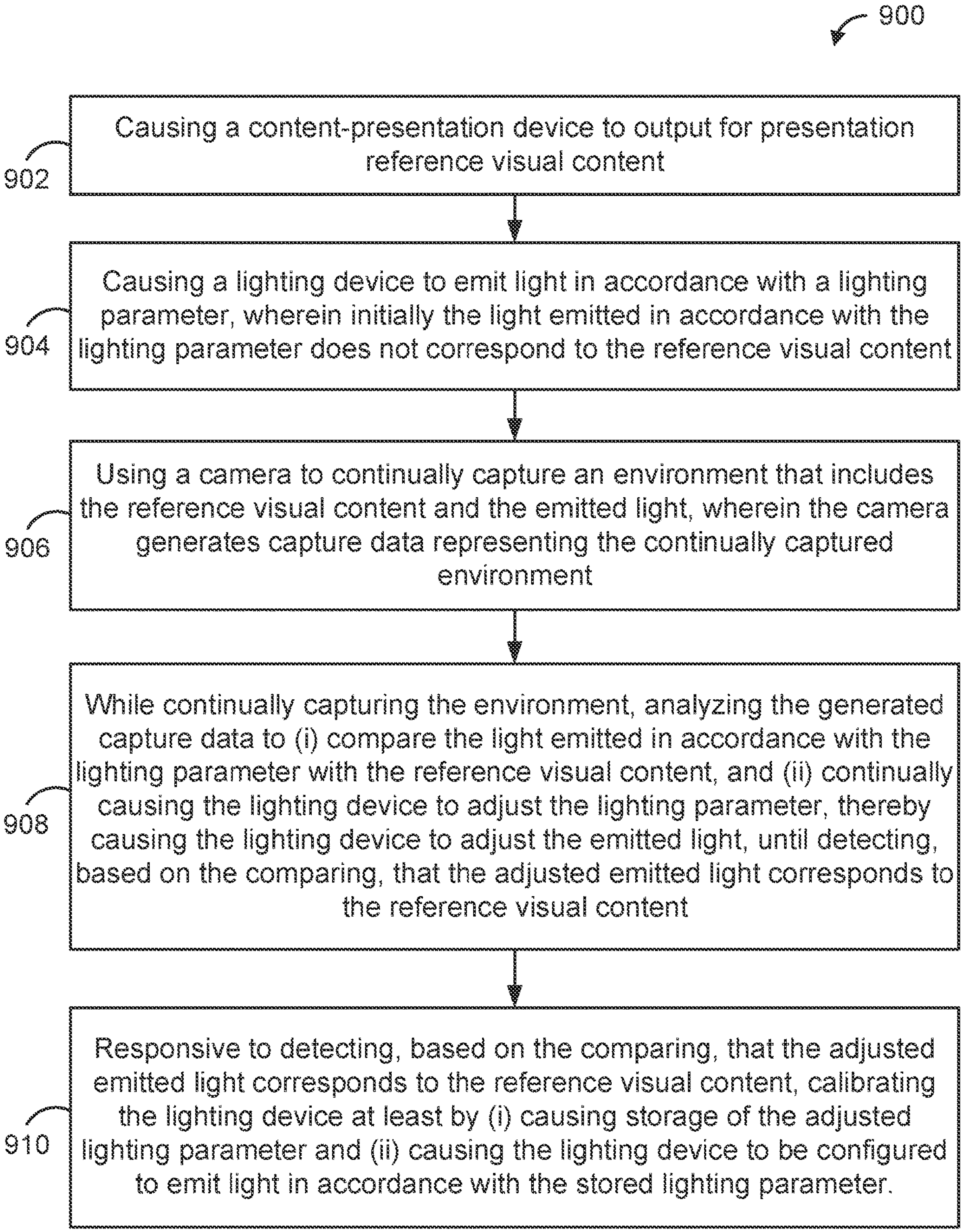
FIG. 9 is a flow chart of another example method.

FIG. 9 is a flow chart illustrating an example method 900. The method 900 can be carried out by a content system, such as the content system 100, the content-presentation device 102, or more generally, by a computing system, such as the computing system 300. At block 902, the method 900 includes causing a content-presentation device to output for presentation reference visual content. At block 904, the method 900 includes causing a lighting device to emit light in accordance with a lighting parameter, wherein initially the light emitted in accordance with the lighting parameter does not correspond to the reference visual content. At block 906, the method 900 includes using a camera to continually capture a scene that includes the reference visual content and the emitted light, wherein the camera generates capture data representing the continually captured scene. At block 908, the method 900 includes while continually capturing the scene, analyzing the generated capture data to (i) compare the light emitted in accordance with the lighting parameter with the reference visual content, and (ii) continually causing the lighting device to adjust the lighting parameter, thereby causing the lighting device to adjust the emitted light, until detecting, based on the comparing, that the adjusted emitted light corresponds to the reference visual content. At block 910, the method 900 includes responsive to detecting, based on the comparing, that the adjusted emitted light corresponds to the reference visual content, calibrating the lighting device at least by (a) causing the lighting device to store the adjusted lighting parameter and (b) causing the lighting device to be configured to emit light in accordance with the stored lighting parameter.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:

causing a content-presentation device to enter a calibration mode in which the content- presentation device outputs for presentation reference visual content displayed at a reference position of a display screen of the content-presentation device;

causing a lighting device to emit light in accordance with a lighting parameter, wherein the lighting parameter specifies a position, within the lighting device, of emitted light, and wherein initially the position of the light emitted in accordance with the lighting parameter does not positionally correspond to the reference position of the display screen of the content-presentation device;

receiving first input indicating an adjustment to the lighting parameter;

responsive to receiving the first input, causing the lighting device to adjust the lighting parameter, thereby causing the lighting device to adjust the emitted light;

receiving second input indicating that the position of the adjusted emitted light positionally corresponds to the reference position of the display screen of the content-presentation device, wherein the second input indicating that the adjusted emitted light positionally corresponds to the reference position of the display screen of the content-presentation device comprises the second input indicating that the position of the emitted light and the reference position of the display screen of the content-presentation device have a threshold extent of positional correspondence with each other; and responsive to receiving the second input, calibrating the lighting device at least by (i) causing storage of the adjusted lighting parameter and (ii) causing the lighting device to be configured to emit light in accordance with the stored lighting parameter.

2. The method of claim 1, wherein the content-presentation device is a television.

3. The method of claim 1, wherein the reference visual content is an image.

4. The method of claim 1, wherein the lighting device is a lighting strip.

5. The method of claim 4, wherein the lighting strip is arranged such that it generally aligns with at least a portion of a perimeter of the display screen of the content-presentation device.

6. The method of claim 1, wherein receiving the first input and receiving the second input comprises receiving each respective input from a remote control device operated by a user.

7. The method of claim 1, wherein causing the lighting device to adjust the emitted light involves moving the position of emitted light in a linearly shifting fashion.

8. A computing system comprising a processor and configured for performing a set of acts comprising:

causing a content-presentation device to enter a calibration mode in which the content- presentation device outputs for presentation reference visual content displayed at a reference position of a display screen of the content-presentation device;

causing a lighting device to emit light in accordance with a lighting parameter, wherein the lighting parameter specifies a position within the lighting device, of emitted light, and wherein initially the position of the light emitted in accordance with the lighting parameter does not positionally correspond to the reference position of the display screen of the content-presentation device;

receiving first input indicating an adjustment to the lighting parameter;

responsive to receiving the first input, causing the lighting device to adjust the lighting parameter, thereby causing the lighting device to adjust the emitted light;

receiving second input indicating that the adjusted emitted light positionally corresponds to the reference position of the display screen of the content-presentation device, wherein the second input indicating that the adjusted emitted light positionally corresponds to the reference position of the display screen of the content-presentation device comprises the second input indicating that the position of the emitted light and the reference position of the display screen of the content-presentation device have a threshold extent of positional correspondence with each other; and responsive to receiving the second input, calibrating the lighting device at least by (i) causing storage of the adjusted lighting parameter and (ii) causing the lighting device to be configured to emit light in accordance with the stored lighting parameter.

9. The computing system of claim 8, wherein the content-presentation device is a television.

10. The computing system of claim 8, wherein the reference visual content is an image.

11. The computing system of claim 10, wherein the lighting device is a lighting strip.

12. The computing system of claim 11, wherein the lighting strip is arranged such that it generally aligns with at least a portion of a perimeter of the display screen of the content-presentation device.

13. The computing system of claim 8, wherein receiving the first input and receiving the second input comprises receiving each respective input from a remote control device operated by a user.

14. A non-transitory computer-readable medium having stored thereon program instructions that upon execution by a processor of a computing system, cause performance of a set of acts comprising:

causing a content-presentation device to enter a calibration mode in which the content- presentation device outputs for presentation reference visual content displayed at a reference position of a display screen of the content-presentation device;

causing a lighting device to emit light in accordance with a lighting parameter, wherein the lighting parameter specifies a position, within the lighting device, of emitted light, and wherein initially the position of the light emitted in accordance with the lighting parameter does not positionally correspond to the reference position of the display screen of the content-presentation device;

receiving first input indicating an adjustment to the lighting parameter;

responsive to receiving the first input, causing the lighting device to adjust the lighting parameter, thereby causing the lighting device to adjust the emitted light;

receiving second input indicating that the adjusted emitted light positionally corresponds to the reference visual content, wherein the second input indicating that the adjusted emitted light positionally corresponds to the reference position of the display screen of the content-presentation device comprises the second input indicating that the position of the emitted light and the reference position of the display screen of the content-presentation device have a threshold extent of positional correspondence with each other; and responsive to receiving the second input, calibrating the lighting device at least by (i) causing storage of the adjusted lighting parameter and (ii) causing the lighting device to be configured to emit light in accordance with the stored lighting parameter.

15. The non-transitory computer-readable medium of claim 14, wherein the content-presentation device is a television.

16. The non-transitory computer-readable medium of claim 14, wherein the reference visual content is an image.

17. The non-transitory computer-readable medium of claim 14, wherein the lighting device is a lighting strip.

18. The non-transitory computer-readable medium of claim 17, wherein the lighting strip is arranged such that it generally aligns with at least a portion of a perimeter of the display screen of the content-presentation device.

19. The non-transitory computer-readable medium of claim 14, wherein receiving the first input and receiving the second input comprises receiving each respective input from a remote control device operated by a user.

20. The non-transitory computer-readable medium of claim 14, wherein causing the lighting device to adjust the emitted light involves moving the position of emitted light in a linearly shifting fashion.

* * * * *